United States Patent [19]
Talluto et al.

[11] Patent Number: 5,640,438
[45] Date of Patent: Jun. 17, 1997

[54] RADIOGRAPHIC FILM MARKER ASSEMBLY

[75] Inventors: Vincent J. Talluto; Edward V. Zlotnicki, both of Dickson City, Pa.

[73] Assignee: SensiQuest, Inc.

[21] Appl. No.: 592,959

[22] Filed: Jan. 29, 1996

[51] Int. Cl.⁶ ..................................................... H05G 1/28
[52] U.S. Cl. ............................................ 378/165; 378/162
[58] Field of Search ..................................... 378/162–166

[56] References Cited

U.S. PATENT DOCUMENTS

| | | |
|---|---|---|
| 2,024,874 | 12/1935 | Prosperi . |
| 3,518,428 | 6/1970 | Ring . |
| 4,127,774 | 11/1978 | Gillen . |
| 4,194,122 | 3/1980 | Mitchell et al. . |
| 4,426,723 | 1/1984 | Rouse . |
| 4,698,836 | 10/1987 | Minasian . |
| 5,297,188 | 3/1994 | Fajac et al. . |
| 5,323,443 | 6/1994 | Lary . |
| 5,345,494 | 9/1994 | Willey . |
| 5,412,706 | 5/1995 | Deibel . |

*Primary Examiner*—Craig E. Church
*Attorney, Agent, or Firm*—Howson and Howson

[57] ABSTRACT

A radiographic film marking kit for use during radiographic procedures to identify a right or left anatomical area or position. The kit consists of two markers with radio-opaque indicia which are removably attachable to a clip for use in positioning a marker along an edge margin of a vertically oriented radiographic film cassette. The markers can also be used individually separate from the clip so that they can be positioned anywhere on the face of a horizontally oriented radiographic film.

20 Claims, 4 Drawing Sheets

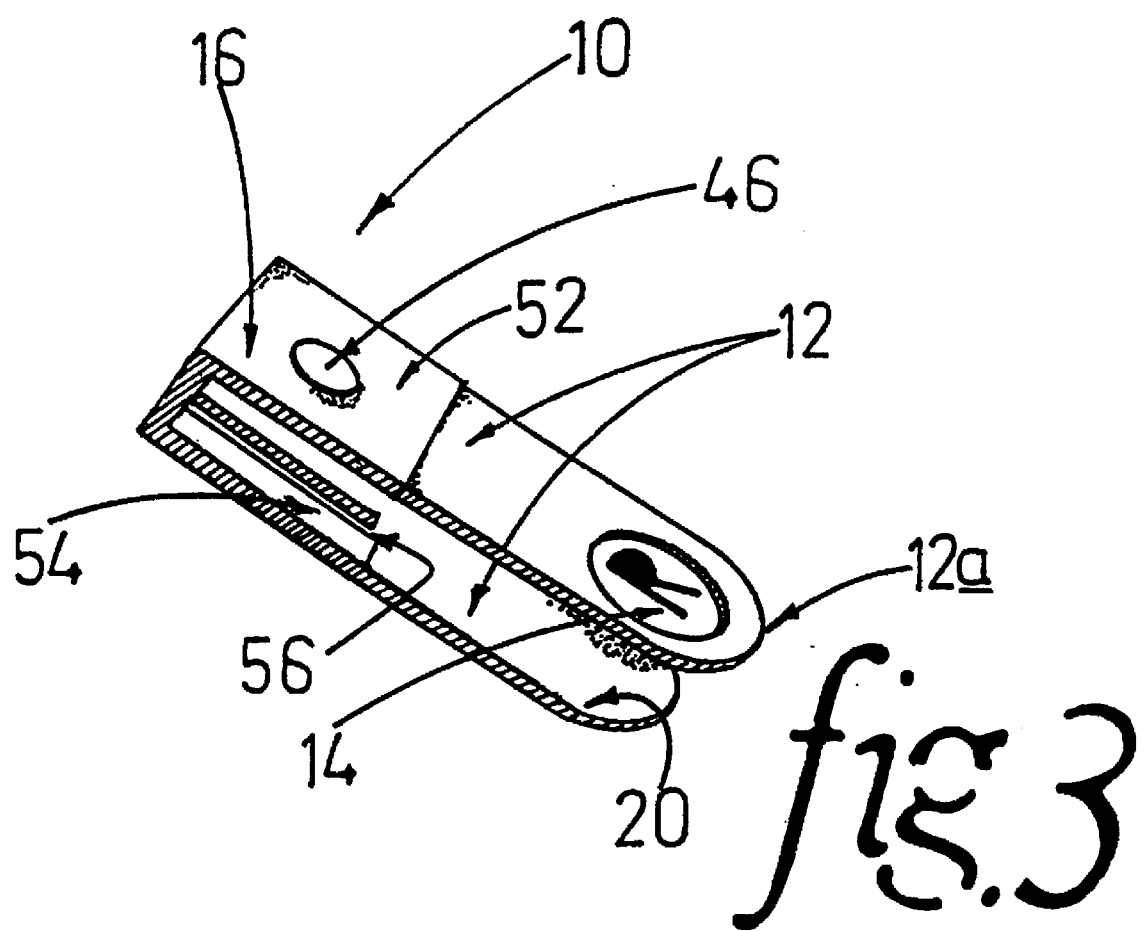

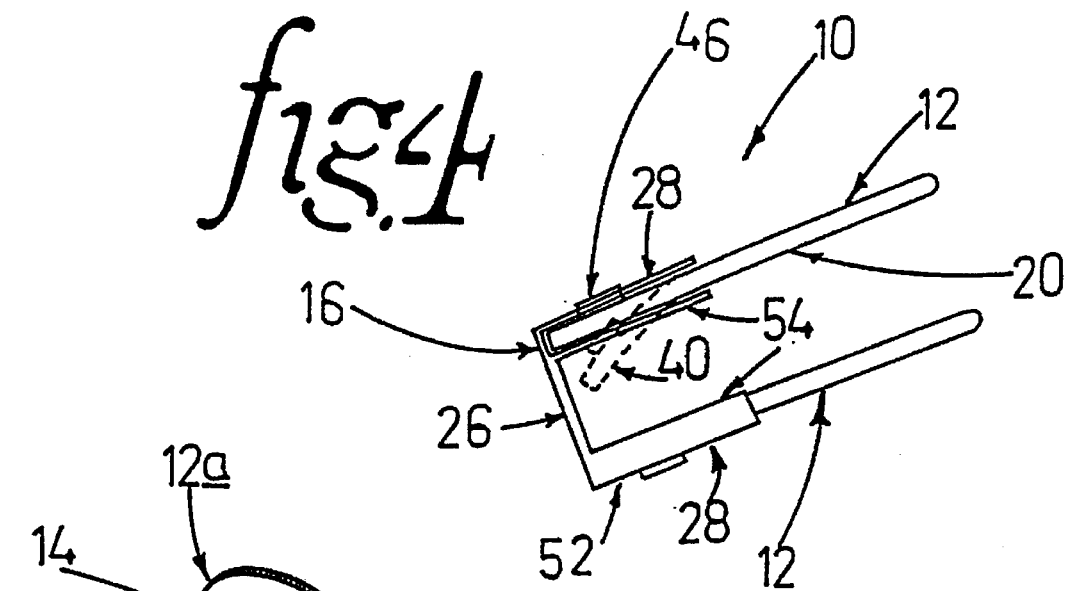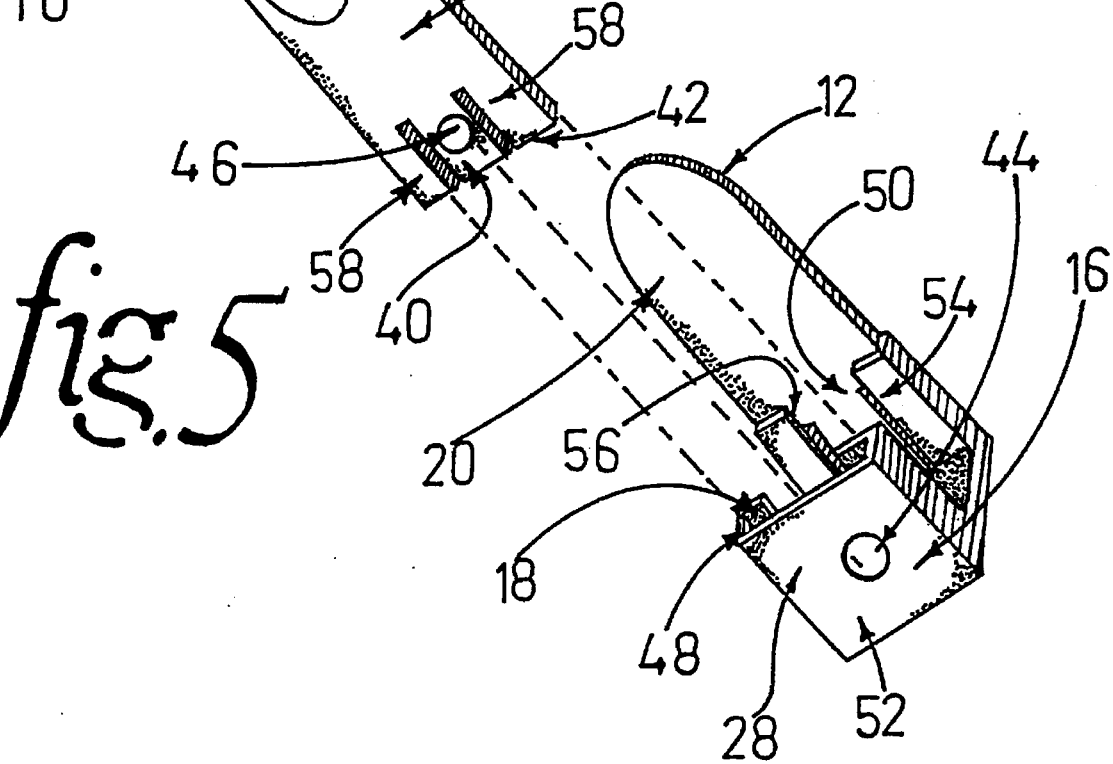

RADIOGRAPHIC FILM MARKER ASSEMBLY

FIELD OF THE INVENTION

The present invention relates generally to the field of diagnostic medical radiology, and more particularly to a multi-part kit used in radiology for correctly identifying either a right or a left anatomical part or position.

BACKGROUND OF THE INVENTION

Radiographic, or X-ray, film markers are used frequently in radiology departments. The markers are used in conjunction with radiographic, or X-ray, films and/or cassettes during radiographic procedures to identify a right or left anatomical area or position being imaged on the exposed film.

During a radiographic procedure where the film is horizontally disposed, a marker may be placed directly on the film anywhere on the face of the film and remains in place by the force of gravity. Such a marker is known as a "flat-type" marker. However, when the X-ray requires a vertically or angularly disposed film, such as a chest X-ray procedure, the flat-type marker must be secured to the film, or the cassette holding the film, in order for the marker to remain in place and appear in the exposure.

A problem which is related to flat-type markers is that during erect radiographic procedures and Potter-Bucky diaphragm procedures, the flat-type markers may become displaced from their predetermined position, thus superimposing in the area of diagnostic interest or not marking the film at all.

It is known in the art to use a "clip-type" marker which is positioned along an edge margin of an X-ray cassette, holder, or X-ray photography machine so that the exposure has marking indicia along an edge of the exposure. For instance, see U.S. Pat. No. 2,024,874 issued to Prosperi which discloses a clip-type marker.

Clip-type markers have the disadvantage of being positionable only along the edge margin of the film which makes proper collimation of the image and marker difficult under certain conditions. Collimation of the exposure is directly proportioned to patient exposure, film quality, and film density. While a clip-type marker is the marker of choice in vertically oriented X-ray film procedures, clip-type markers are not always useful in horizontally oriented X-ray film procedures because of the collimation problem.

Most radiology departments maintain supplies of both flat-type markers and clip-type markers, since neither one of these markers is versatile enough for all radiographic procedures.

Various attempts have been made to address the above listed problems. Markers have been made with adhesive backings so that they stick to the face of the film, or they have been applied with a strip of transparent surgical tape to secure them to the film. For instance, see U.S. Pat. No. 5,323,443 issued to Lary, U.S. Pat. No. 5,345,494 issued to Willey, and U.S. Pat. No. 4,194,122 issued to Mitchell et al. Another means to secure a marker is through the use of hook and loop fastening material such as VELCRO loop material as disclosed in U.S. Pat. No. 5,412,706 issued to Deibel. Suction cups have been used to attach markers to X-ray films as disclosed in U.S. Pat. No. 5,297,188 issued to Fajac et al., U.S. Pat. No. 4,426,723 issued to Rouse and U.S. Pat. No. 4,127,774 issued to Gillen. X-ray cassettes have been provided with mechanical structure to place the marker on the face of the film such as disclosed in U.S. Pat. No. 4,698,836 issued to Minasian and U.S. Pat. No. 3,518,428 issued to Ring.

Although various ones of the referenced radiographic and X-ray markers may function satisfactorily for their intended purposes, there is a need for a single convenient and versatile device for correctly indicating anatomical position or part on a radiographically exposed film. Such a single device should allow placement on a horizontally disposed X-ray film anywhere on the face of the film so that X-ray beam collimation will be precise and allow the same marker to be positioned along an edge margin of a vertically oriented X-ray film cassette.

OBJECTS OF THE INVENTION

With the foregoing in mind, a primary object of the present invention is to provide a radiographic film marker assembly which combines a flat and clip type marker into a single device.

Another object of the present invention is to provide a marker which can be used without the need for tape or other securing means, such as VELCRO loop material or suction cups.

A further object of the present invention is to provide a radiographic film marker assembly readily converted between a clip and flat-type marker to fulfill the X-ray technician's need in performing his or her duty.

SUMMARY OF THE INVENTION

More specifically, the present invention provides a radiographic film marking kit or assembly for use on a radiographic film or a radiographic cassette during radiographic procedures. The kit allows an exposed radiographic film to properly identify an anatomical area or position.

The kit comprises a pair of markers, one having a radio-opaque indicia for identifying a right anatomical area or position, and one having a radio-opaque indicia for identifying a left anatomical area or position. Each of the markers has a substantially flat backwall for engaging the face of the radiographic film and a resiliently deflectable end portion.

The kit also includes a clip which is removably engageable with an edge of the radiographic film cassette. The clip has an attachment means for removably capturing the resiliently deflectable end portions of both markers such that the pair of markers can be retained in a spaced, back-to-back relationship.

When the pair of markers are disconnected from the clip, the markers can be positioned anywhere on a horizontally oriented radiographic film. When the pair of markers are connected to the clip, one of the markers can be positioned along a front edge margin of a vertically or angularly oriented radiographic film cassette.

Thus, the kit provides a single marker assembly which can be used as a flat or clip type marker and is readily interchangeable therebetween.

BRIEF DESCRIPTION OF THE DRAWINGS

The foregoing and other objects, features and advantages of the present invention should become apparent from the following description when taken in conjunction with the accompanying drawings, wherein:

FIG. 3 is a perspective view of the marker assembly assembled as a clip type marker;

FIG. 4 is a side elevational, partially-sectioned, view of FIG. 3 showing in dashed lines a portion of one of the markers deflected into an unlocking position; and FIG. 5 is an exploded perspective view of the marker assembly with the left marker disconnected from the clip.

DESCRIPTION OF THE PREFERRED EMBODIMENT

Figure 1:
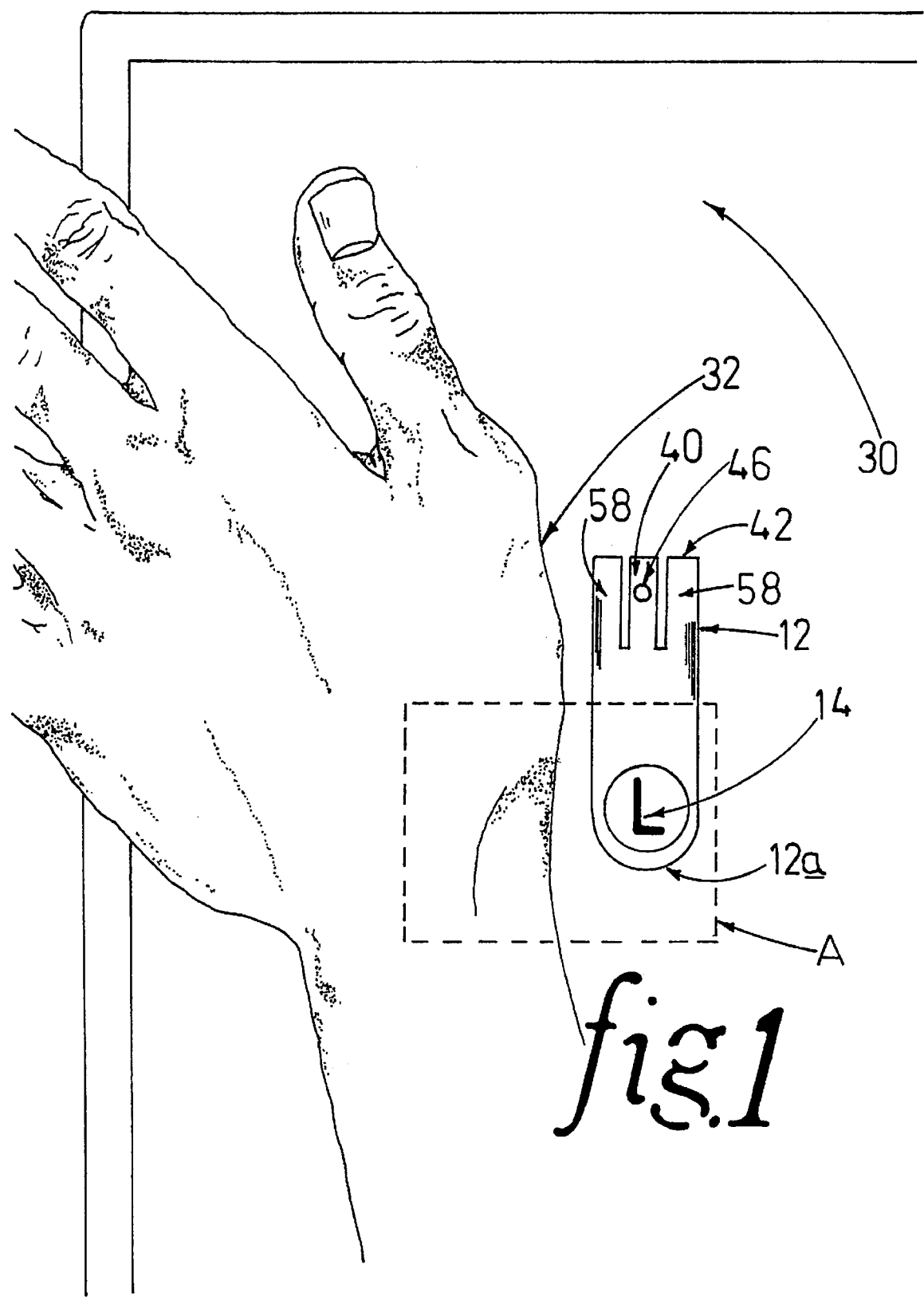
FIG. 1 is a plan view of a marker assembly embodying the invention shown being used as a flat type marker during a radiographic examination of the navicular bone of the left wrist.

A radiographic film marking kit, or assembly, 10 is illustrated in FIG. 3. The kit 10 can be used in conjunction with a radiographic film or a radiographic film cassette during radiographic procedures to aid in the identification of an anatomical area or position on an exposed radiographic film. As will be discussed in detail, the marking kit 10 can be used to identify an anatomic area or position anywhere on the face of a horizontally oriented radiographic film as well as along the edge margin of a vertically or angularly oriented radiographic film cassette.

The marking kit 10 has at least one marker 12 with a radio-opaque indicia 14. The kit 10 as illustrated in the drawings utilizes a pair of markers 12 and indicia 14 which are the letters "R" and "L" to indicate either a right or left anatomical area or position. In the illustrated embodiment, the marker 12 is thin, flat and flexible, and has a curved free end 12a and a slotted trifurcated mounting end 42. Preferably, the marker 12 is fabricated of plastic. It is within the scope of the invention to use any number of markers having various indicia.

The marker 12 is located adjacent a front part of the radiographic film prior to exposure of the film. The radio-opaque indicia 14 appears legibly on the exposed radiographic film and denotes information pertaining to the anatomical area or position.

The marking kit 10 includes a clip 16 with an attachment means 18 to allow the markers 12 to be removeably connected to the clip 16. As will be discussed, the clip 16 is engagable with an edge margin of a radiographic film cassette so that it can locate one of the markers 12 along a front edge margin adjacent the front face of the radiographic film.

An example of a radiographic procedure which utilizes a horizontally oriented radiographic film 30 is a radiographic examination of the navicular bone of a left wrist 32. This is illustrated in FIG. 1. The marker 12 has the radio-opaque indicia 14 identifying L, or left, and is disengaged from the clip 16 and placed on the face of the radiographic film 30 in relatively close relation to the navicular bone being examined. The marker 12 has a substantially flat back wall 20 for readily being located on the face of the radiographic film 30. As shown in FIG. 1, the area designated "A" shown in dashed lines is the area of interest and where the exposed film will have proper collimation. Outside of area "A" it is not necessary for the developed film to be in focus and have proper collimation. If marker 12 were located along an edge margin of the radiographic film 30, the indicia 14 would appear out of focus on the exposure and would not be readable. Thus, a clip-type marker cannot provide a convenient or readily obtainable marking on the exposure of a radiographic examination of the navicular bone of the wrist, or of any other radiographic procedures involving a horizontally oriented radiographic film and the need for a precise image of a small area.

Figure 2:
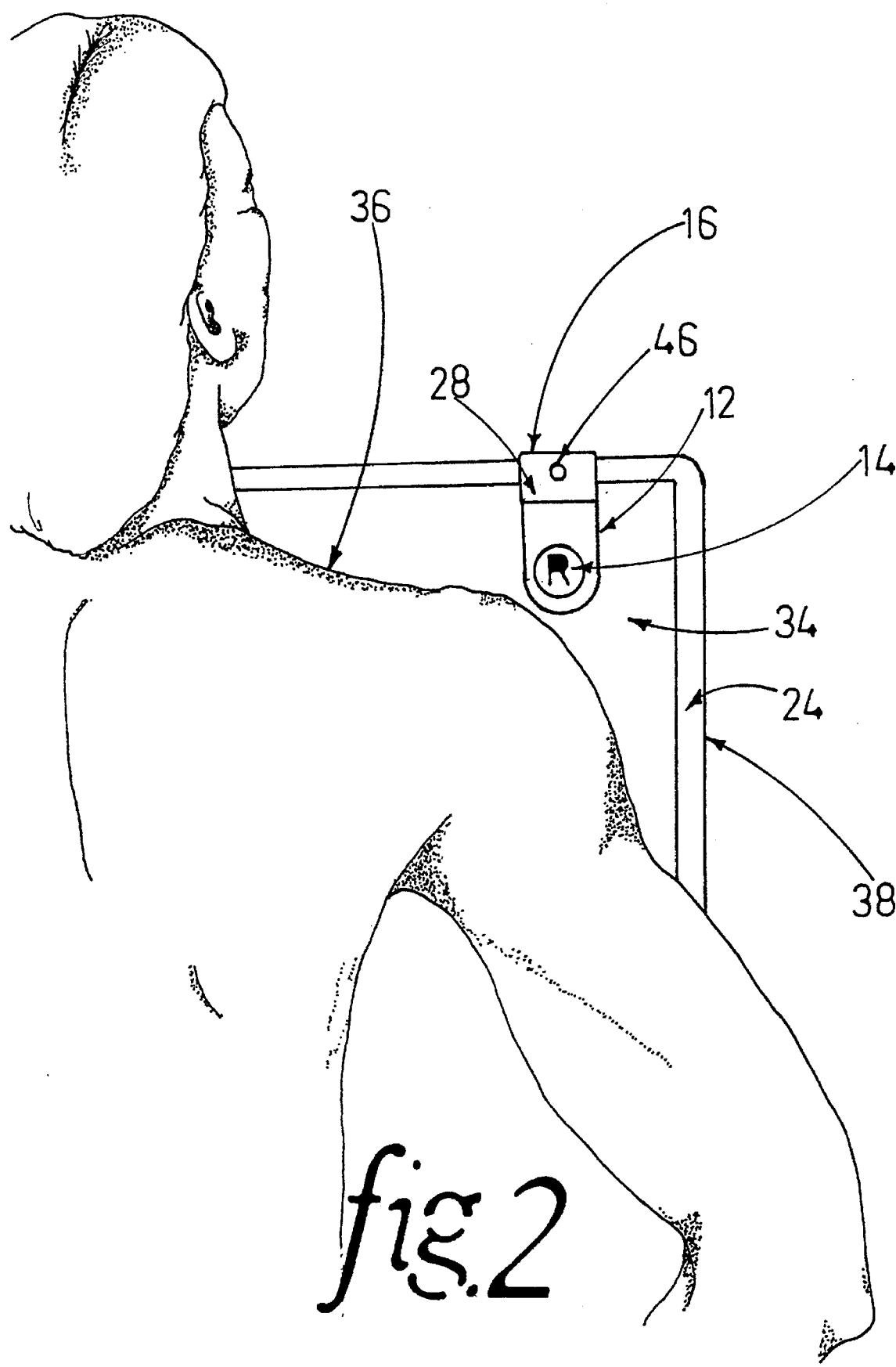
FIG. 2 is an elevational view showing the marker assembly being used as a clip type marker during a radiographic examination of the chest.

An example of a radiographic procedure which utilizes an angularly, or vertically, oriented radiographic film 34 is a radiographic examination of the chest. This is illustrated in FIG. 2. A radiographic film cassette 24 is vertically oriented with the patient 36 standing adjacent the radiographic film 34. Since this examination is of a large area, there is no problem with collimation in the exposure. Thus, a marker 12 can be clipped to the side 38 of the radiographic film cassette 24 to locate the marker 12 along an edge margin of the radiographic film 34. This can adequately accomplish the identification of an anatomical area or position. As shown in FIG. 2, the clip 16 engages the side edge of the radiographic film cassette 24 and locates the marker 12 adjacent the front edge margin of the radiographic film 34. In this instance, the indicia 14 identifies R, or right, anatomical area of the patient's chest.

In order to provide the kit 10 with a means of engaging the side edge of a cassette, the clip 16 has a base 26 and a pair of spaced parallel legs 28 extending in a transverse direction from the base 26. The base 26 confronts the side edge of the radiographic film cassette and the legs 28 extend over a front and back edge margin of the cassette.

The legs 28 form the attachment means 18 for removably capturing the markers 12 to the clip 16. To this end, each leg 28 has an outer wall portion 52 with an aperture 44 for receiving a projection 46 on a marker 12. Each leg 28 also has inturned inner wall portions 54 which cooperate with the outer wall portion 52 to form a narrow channel 48 of substantially the same width as the marker 12. The inturned inner wall portions 54 terminate in spaced parallel edges 56 to define a slot 50.

Each marker 12 has a resiliently deflectable end portion 40 which is capable of being deflected into an unlocking position and being resiliently biased into a locking position to facilitate connection and removal from the clip 16. The dashed lines shown in FIG. 4 illustrate the deflectable end portion 40 in the unlocking position in a greatly exaggerated position. The channel 48 receives the slotted trifurcated mounting end 42 of the marker 12 and the deflectable end portion 40 is initially deflected into the unlocking position. The slot 50 provided by the leg 28 allows the deflectable end portion 40 to deflect into the unlocking position while outer fingers 58 of the slotted trifurcated mounting end 42 are telescopically received within the channel 48. When the end portion 40 is fully extended into the leg 28, the end portion 40 is resiliently biased into the locking position and captured by the leg 28.

As shown in the drawings, the projection 46 extends transversely from the deflectable end portion 40. The aperture 44 in the outer wall portion 52 receives the projection 46. When the deflectable end portion 40 is fully inserted into the leg 28, aperature 44 and projection 46 cooperate to lock the marker 12 to the clip 16. When the legs 28 capture at least one of the markers 12, the marking kit 10 can be used as a clip-type marker. When both markers 12 are connectable to the clip 16, they are positioned in a spaced back-to-back relationship.

For disengagement, a technician merely presses against the projection 46 on the marker 12 to extend it through the aperture 44 in the leg 28 and to deflect the end portion 40 of the marker into the unlocking position. The marker 12 can then be removed from the leg 28 of the clip 16 by sliding it outwardly. Thereafter, the marker 12 can be used as a flat type marker until it is reconnected to the clip 16.

In view of the foregoing, it should be apparent that the present invention now provides an improved marker assembly which is useful in enabling proper marking to be accomplished in a variety of radiographic procedures.

While the preferred embodiment of the present invention has been described in detail, various modifications, alterations, and changes may be made without departing from the spirit and the scope of the present invention as defined in the appended claims. For instance, the markers 12 could have a resilient deflectable end portion which deflects toward the sides of the clip 16. The sides of the clip 16 could have side aperatures which cooperate with laterally extended projections of the markers.

We claim:

1. A radiographic film marker assembly for use on a radiographic film or a radiographic film cassette during radiographic procedures to identify an anatomical area or position on an exposed radiographic film, comprising:

at least one marker having a radio-opaque indicia; and a clip having attachment means for removably connecting to said at least one marker, said clip being removably engageable with an edge margin of the radiographic film cassette;

wherein when said at least one marker is disconnected from said clip, said at least one marker can be positioned on a horizontally oriented radiographic film; and wherein when said at least one marker is connected to said clip, said at least one marker can be positioned along the edge margin of a vertically or angularly oriented radiographic film cassette.

2. A radiographic film marker assembly according to claim 1, wherein said clip has a base and a pair of spaced parallel legs extending in a transverse direction from said base, said base is capable of engaging an edge of the radiographic film cassette, and said legs are capable of extending over a front and back edge margin of the radiographic film cassette.

3. A radiographic film marker assembly according to claim 2, wherein said attachment means is located on at least one of said legs and is capable of capturing said at least one marker.

4. A radiographic film marker assembly according to claim 3, wherein said at least one marker has a resiliently deflectable portion capable of being deflected into an unlocking position and being resiliently biased into a locking position.

5. A radiographic film marker assembly according to claim 4, wherein said attachment means is capable of receiving and capturing said at least one marker such that said resiliently deflectable portion is initially deflected into an unlocking position until fully extended into said attachment means when said resiliently deflectable portion is resiliently biased into a locking position and captured by said attachment means.

6. A radiographic film marker assembly according to claim 5, wherein said resiliently deflectable portion has a projection and wherein said at least one leg has an aperture for capturing said projection.

7. A radiographic film marker assembly according to claim 6, wherein said at least one marker has a slotted, trifurcated mounting end which includes said resiliently deflectable portion.

8. A radiographic film marker assembly for use on a radiographic film or a radiographic film cassette during radiographic procedures to identify an anatomical area or position on an exposed radiographic film, comprising:

at least two markers each having a different radio-opaque indicia, each said marker having a substantially flat back wall portion for engaging the radiographic film; and a clip having attachment means for removably connecting at least two of said markers in a spaced, back-to-back relationship, said clip being removably engageable with an edge margin of the radiographic film cassette;

wherein when said markers are disconnected from said clip, said markers can be positioned on a horizontally oriented radiographic film; and wherein when said at least two markers are connected to said clip, one of said markers can be positioned along a front edge margin of a vertically or angularly oriented radiographic film cassette.

9. A radiographic film marker assembly according to claim 8, wherein each said marker has a slotted, trifurcated mounting end with a resiliently deflectable portion capable of being deflected into an unlocking position to remove said marker from said clip, and being resiliently biased into a locking position to be captured by said attachment means.

10. A radiographic film marker assembly according to claim 9, wherein said attachment means comprises a pair of spaced parallel legs extending from said clip and capable of extending on an opposite front and back side along the edge margin of a radiographic film cassette.

11. A radiographic film marker asssembly according to claim 10, wherein each said leg has an outer wall portion and a pair of inturned inner wall portions which define a channel for receiving said mounting end of one of said markers.

12. A radiographic film marker assembly according to claim 11, wherein said pair of inturned inner wall portions define a slot in said channel for allowing said resiliently deflectable portion to deflect into said unlocking position when said mounting end is fully inserted into said leg.

13. A radiographic film marker assembly according to claim 12, wherein each said resiliently deflectable portion has a projection, and wherein each leg on said outer wall portion has an aperture for receiving said projection.

14. A radiographic film marker assembly according to claim 13, wherein one of said radio-opaque indicia identifies a right anatomical area or position and another of said radio-opaque indicia identifies a left anatomical area or position.

15. A radiographic film marker assembly for use on a radiographic film or a radiographic film cassette during radiographic film cassette during radiographic procedures to identify an anatomical area or position on an exposed radiographic film, comprising:

a pair of markers, one having a radio-opaque indicia for identifying a right anatomical area or position, and one having a radio-opaque indicia for identifying a left anatomical area or position, each said marker having a substantially flat back surface for engaging the radiographic film, and each said marker having a resiliently deflectable end portion; and a clip for removably engaging an edge margin of a radiographic film cassette, said clip having attachment means for removably capturing said resiliently deflectable end portion of each said marker such that said pair of markers are retained in a spaced, back-to-back relationship;

wherein when said pair of markers are disconnected from said clip, said markers can be positioned on a horizontally oriented radiographic film; and wherein when said pair of markers are connected to said clip, one of said markers can be positioned along a front edge margin of a vertically or angularly oriented radiographic film cassette.

16. A radiographic film marker assembly according to claim 15, wherein said clip has a base for confronting a side edge of the radiographic film cassette.

17. A radiographic film marker assembly according to claim 16, wherein said attachment means comprises a pair of hollow, spaced apart, parallel legs extending in a transverse direction from said base.

18. A radiographic film marker assembly according to claim 17, wherein each said leg is capable of telescopically receiving said resiliently deflectable end portion of one of said markers.

19. A radiographic film marker assembly according to claim 18, wherein said resiliently deflectable end portion is capable of being deflected into an unlocking position to initially install said marker to said clip or to remove said marker from said clip; and wherein said resiliently deflectable end portion is capable of being resiliently biased into a locking position when said resiliently deflectable end portion is fully telescopically received by said leg so that said marker is captured by said clip.

20. A radiographic film marker assembly according to claim 19, wherein said resiliently deflectable end portion has a projection; and wherein each said leg has a cooperating aperture for receiving said projection.

* * * * *